INVENTORS
DAVID J. CHLECK
PHILIP GOODMAN

United States Patent Office 3,523,244
Patented Aug. 4, 1970

3,523,244
DEVICE FOR MEASUREMENT OF ABSOLUTE HUMIDITY
Philip Goodman, Lexington, and David J. Chleck, Brookline, Mass., assignors, by mesne assignments, to Panametrics, Inc., New York, N.Y., a corporation of Delaware
Continuation-in-part of application Ser. No. 624,056, Mar. 17, 1967. This application Nov. 1, 1967, Ser. No. 683,084
Int. Cl. G01r 27/02; G01n 25/56; H01c 13/00
U.S. Cl. 324—61                                   7 Claims

ABSTRACT OF THE DISCLOSURE

A device for measurement of absolute humidity by measuring the change in impedance of an element. The element is an aluminum oxide layer on an aluminum base, serving as one electrode with a second electrode contacting another surface of the aluminum oxide layer.

BACKGROUND OF THE INVENTION

Field of the invention

This application is a continuation-in-part of co-pending patent application Ser. No. 624,056 filed Mar. 17, 1967 now abandoned entitled "Water Vapor Sensor."

This invention relates in general to the measurement of water vapor and more particularly to a solid state sensor providing rapid measurement of absolute humidity over a wide range of ambient temperature and pressure conditions.

DESCRIPTION OF THE PRIOR ART

Measurement of the amount of water vapor in a gaseous atmosphere is important in a number of widely different situations. These range from sensing the humidity for purposes of controlling an industrial process or a laboratory environment to airborne meteorological measurement. Measurement of water vapor is generally expressed in terms of either absolute humidity or relative humidity. Relative humidity is a measurement of water vapor in which the water vapor concentration is expressed as a percentage of the maximum water vapor pressure possible at the ambient temperature. Absolute humidity, on the other hand, is a measurement of the actual vapor pressure of water in the atmosphere. Thus relative humidity is a temperature dependent quantity and is an insufficient measurement of the amount of water for any situation in which the temperature is not simultaneously being monitored. This is particularly so where rapid changes of both temperature and water vapor are liable to be encountered.

One recent advance in the measurement of water vapor is the humidity sensor element described in U.S. Pat. No. 3,075,385 issued Jan. 29, 1963 to C. M. Stover. The sensor described therein provides an electrical output and is relatively small and therefore suitable for use in meteorological measurements using radiosondes. The sensor described in the Stover patent includes an aluminum base on which is coated a porous aluminum oxide layer to a thickness of approximately .000075 inch. A portion of this oxide is coated with plastic such as Lucite an an evaporated metal film is coated directly onto the remainder of the oxide surface as well as over a portion of the plastic surface. Electrical connections are then made to both the thin metal film and the aluminum base. The characteristic of this device is that changes in relative humidity cause corresponding changes in the resistance and capacity between the two electrical connections. The electrical output then varies approximately as the relative humidity of the atmosphere in which the sensor is located. This sensor does not provide a direct indication of absolute humidity and, additionally, its response to rapid, wide changes in humidity is relatively slow.

SUMMARY

It is therefore a primary object of the present invention to provide a sensor element for measuring absolute humidity substantially independently of the ambient temperature and pressure.

It is further an object of the present invention to provide a sensor element having a very rapid response to abrupt changes in absolute humidity.

It is another object of the present invention to provide a method for manufacturing a solid state humidity sensor element for measuring absolute humidity.

Broadly speaking, the humidity sensor of this invention includes an aluminum base member, on which is coated an aluminum oxide layer with a thickness of approximately .00001". A thin conductive electrode has been evaporated on top of the entire oxide surface and electrical connections are made to both the aluminum base and to the thin evaporated electrode. No plastic is allowed to contact any portion of the aluminum oxide surface. The capacitance and resistance between the two electrical connections on this sensor varies in proportion to the absolute humidity or water vapor pressure in the atmosphere to which it is exposed. The sensor provides extremely rapid response to changes in water vapor and its response is independent of the ambient temperature and pressure.

BRIEF DESCRIPTION OF THE DRAWING

Other objects and advantages will become apparent from the following detailed description when taken in conjunction with the accompanying drawing in which.

DESCRIPTION OF THE PREFERRED EMBODIMENT

Figure 1:
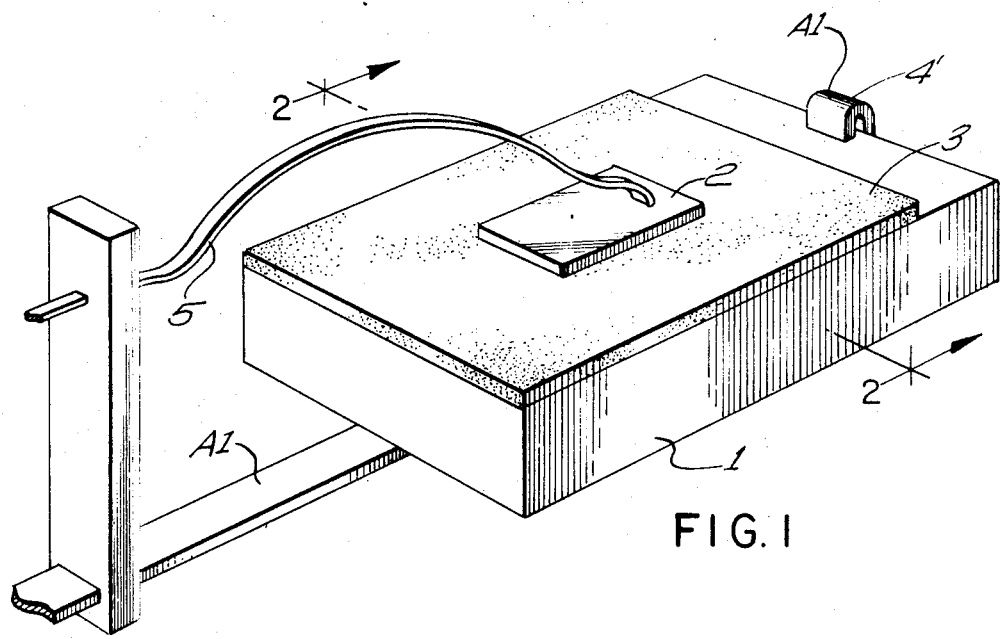
FIG. 1 is a perspective view of a humidity sensor constructed in accordance with the principles of this invention.
Figure 2:
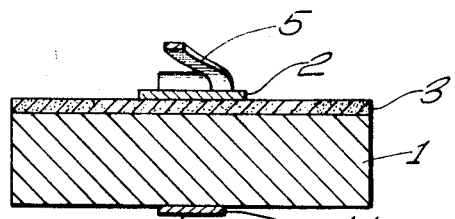
FIG. 2 is a cross-sectional view taken along the line 2—2 of FIG. 1.

With reference now particularly to FIG. 1, the sensing element of the present invention is shown as a laminate having a base 1 of aluminum, an upper layer 2 composed of an electrically conductive metal and an intermediate layer 3 of aluminum oxide. Connected to the base 1 and the top metal layer 2 are electrical leads 4 and 5 respectively. More particularly, the base 1 is formed preferably of hard drawn aluminum sheet of at least 99% purity. A superpure aluminum material having a purity of 99.99% yields the most satisfactory results, but the less pure aluminum may also be used. For best results the base 1 should be formed of a substantially uniform thickness of aluminum, which may be of any thickness from about .0005″ to about .125″. A smooth, brightly finished surface on the base member is desirable and a special chemical bright dip may be used for enhancing this brightness.

The upper surface of the aluminum base 1 is oxidized to form the porous oxide layer 3. Typically, the oxide layer may be formed by an anodizing process in which an alternating current is passed through a heated sulphuric acid solution containing the base plate. For this purpose excellent results have been obtained using a 50% sulphuric acid solution at 90° F. with an alternating current intensity of 12 amps per square foot of the aluminum surface, for a period of 25 minutes. In order to leave room for the attachment of an electrical lead 4 to the base 1, a specific area of the base surface may be masked prior to anodizing.

The anodized surface coating 3 initially formed on the base by this anodizing process is normally somewhat porous and moisture may pass through the surface coating 3 to the base member 1. The overall thickness of the oxide layer at this point is about .000075″. The amorphous aluminum oxide coating is characterized by a regular deep narrow capillary pore structure in which each pore is approximately 70 A. wide and sufficiently deep so that the oxide layer beneath the bottom of the pore opening is approximately 11 A. thick. The pores are separated on the average by approximately 160 A. as measured from the center of the pores. At this stage the material is boiled for approximately 30 minutes in a container of boiling distilled water. The coating remains approximately .000075″ thick. This coating is then brushed until the film thickness is reduced to approximately .00001″. The oxide has now been converted from an amorphous oxide to a hard hydrated version of aluminum oxide, designated boehemite and characterized by an irregular pore structure in which the necks of the pores are considerably narrowed. The pore base remains about 11 A. thick.

After processing of the oxide coating, a template is placed over the exposed surface of the oxide coating 3 and an electrically conducting metal layer 2 is deposited over a specific area of the oxide. The selection of the particular metal for the top layer 2 will depend upon the desired characteristics of the specific humidity sensing element. While any of a variety of conventional deposition metals such as aluminum, copper, gold, iron and platinum may be used, palladium and Nichrome are preferred because of their excellent adhesive characteristics whereas gold offers chemical inertness. It is desirable to maintain the thickness of the top metallic layer as thin as possible and one method of controlling this thickness during this process is by measuring the resistance change in a glass plate which is positioned to receive the same metallic deposition as the oxide layer. Typical values of the resistance change are a change of 2 to 20 ohms per square inch for gold, while with Nichrome or palladium a change in the order of 100 to 1,000 ohms is sufficient. The palladium and Nichrome films may be made thinner than the more conventional metals because of their excellent adhesive characteristics. It is desirable to maintain this upper electrode as thin as possible in order that the metallic layer does not close the tops of the pores in the oxide coating any more than necessary.

Electrical connecting leads 4 and 5 are next attached to the laminate formed by the base 1, the top metal electrode 2, and the intermediate oxide coating 3. Lead 4 is preferably formed from an aluminum bus wire having an end $4^1$ crimped over the edge of the non-anodized portion of the base 1 to make electrical contact only with this base. The electrical lead 5 is preferably formed of a thin copper or gold wire which can be cemented to the top metal layer 2 by a dot of silver conducting paint. Alternately, mechanical contact to the top electrode 2 can be made and maintained. A variety of mountings are possible.

Figure 4:
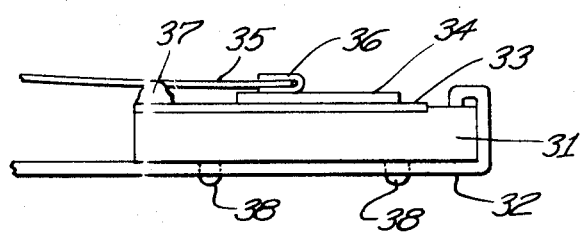
FIG. 4 is a cross-sectional view of a second embodiment of a humidity sensor constructed in accordance with the principles of this invention.

Referring to FIG. 4 an alternative embodiment of the sensor is shown. In this embodiment an aluminum bus wire 32 is laid along the bottom of the base 31 and crimped over one edge to form electrical contact. The bus wire 32 may be attached to the underside of the base 31 with small blobs 38 of epoxy. Again in this embodiment a thin gold layer 34 adhered to the upper surface of the oxide coating 33, serves as the second electrode. The contact is made to this second electrode via a spring 35 which has a small gold cap 36 spot welded to it. A small portion of epoxy 37 is used to fasten the spring 35 to the base 31 at a point well removed from the second electrode 34. The epoxy is carefully applied so that the spring 35 is insulated from the base 31. The tension of the spring acting through the soft gold contact 36 provides an excellent electrical contact for the second electrode, and one which is entirely free, in the electrode area, of any hydroscopic material whatsoever. The epoxy 37 maintains the position of the spring even under relatively high vibration forces.

Figure 5:
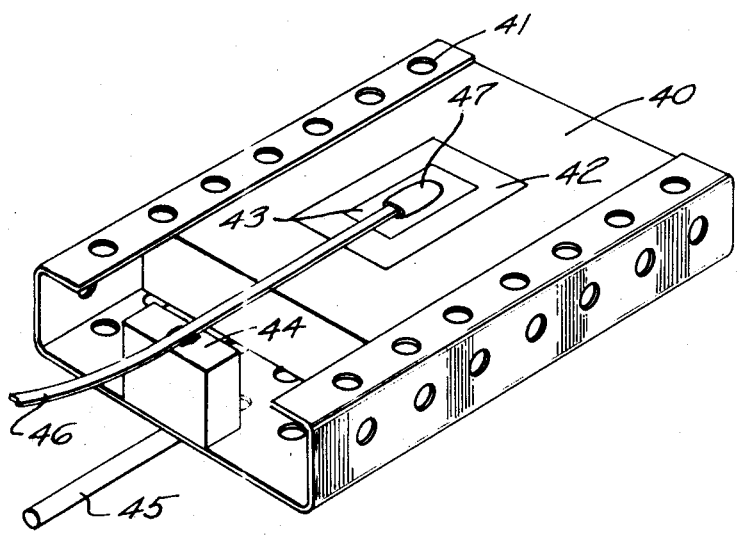
FIG. 5 is an illustration in perspective view of a third embodiment of a humidity sensor constructed in accordance with the principles of this invention.

Another embodiment is illustrated in FIG. 5. In this configuration, a stainless steel screen 41, typically formed of 10 mil thick stainless steel is spot welded to the bottom of the aluminum base plate 40 and wrapped around the two long edges of this base plate. Typical dimensions for the base plate 40 are a length of 1.6 centimeters and a width of ½ centimeter. If the stainless steel screen 41 is 2 centimeters long, then a section of screen approximately .4 centimeter long by ½ centimeter wide extends below the edge of the base plate 40. Onto this extended portion of the screen 41 there is soldered a pad 44 formed of a phenolic board with a copper coating on the top and bottom. A spring lead 46 with a thin gold cap 47 spot welded to one end of it is used to contact the second electrode 42 and this lead 46 is soldered to the upper surface of the phenolic pad 44. The second lead 45 is spot welded to the steel screen 41 and is thus electrically connected to the base 40. With the arrangement illustrated in FIG. 5, there is no plastic or other hygroscopic material anywhere on the base plate.

Figure 6:
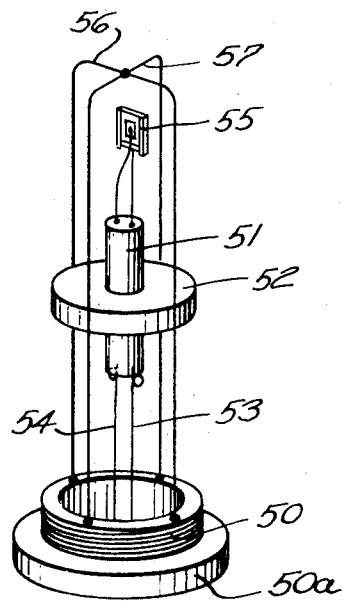
FIG. 6 is a perspective view of a mounting arrangement for a humidity sensor constructed in accordance with the principles of this invention.

For most applications the sensor elements must be mounted in a probe which provides both electrical insulation and mechanical stability. Referring to FIG. 6, a base 50, which is generally cup shaped and has a mounting flange 50a, includes an electrical feed through (not shown) to which are connected the two electrical leads 53 and 54. Each of these leads is carried into an insulating cylinder 51 which has a concentric flange 52 fixed to it. The electrical leads 53 and 54 are carried through the insulating cylinder 51 and attached in one of the ways previously described to the sensor element 55. A pair of guard wires 56 and 57 are fastened to the base member 50 and extend in a generally U-shaped configuration over the sensor to protect it. The flange 52 is effectively caged within the two guard wires 56 and 57 and hence the entire structure is relatively sturdy even under mechanical vibration. The insulating cylinder 51 and flange 52 would be typically formed of a rugged insulating material such as Teflon.

The sensor element described is entirely free from plastic materials, except in the case where a minute amount is associated with the silver paint as a binder. The absence of any hygroscopic material in contact with the oxide layer, together with the thinness of the oxide layer, renders this sensor temperature and pressure insensitive and accordingly its response in terms of change of resistance and capacitance is directly related to absolute humidity. Additionally the thinness of the oxide coating and the elimination of the hygroscopic material permit a greater speed of response to variations in humidity. Typically, an approximate pulse change in absolute humidity from a value of 10,000 micrograms H₂O/liter air to a value of 10 micrograms H₂O/liter air will be indicated as shown below.

Percent electrically indicated change in
| water vapor concentration: | Time (sec.) |
|---|---|
| 63 | 0.75 |
| 90 | 5.0 |
| 95 | 15.0 |
| 100 | 300.0 |

The relatively slow final response to large humidity changes is occasioned by cracks and fissures which are present in the oxide layer surrounding the pores. While liquids collected in these cracks and fissures will not effect the electrical characteristics of the sensor since the "water traps" are effectively short circuited, the presence of the moisture in these water traps does effect the rate at which the sensor will achieve equilibrium. For relatively small variations in humidity, the electricty changes indicated by the sensor are due only to the free passage of moisture through the pores of the oxide coating 3, and accordingly, a very rapid rate of response results. However, for very large moisture changes on the order of 10,000 micrograms H₂O/liter, the initial movement of the moisture from the pores takes place rapidly and is then followed by a relatively slow diffusion of liquid from the cracks or fissures into the pores. It is therefore the presence of these cracks or fissures which occasion the relatively slow final equilibrium time for very large changes in humidity.

In order to reduce this effect an additional step may be included in the manufacturing process; after the sensor element is completely fabricated (and preferably after the leads have been attached) the entire assembly is baked at a temperature between 200° C. and 350° C. for a period of time between 30 and 90 minutes. The baking at relatively high temperatures eliminates these fissures and cracks and hence provides for rapid response of the sensor element even to these relatively large changes in moisture. The same baking also serves to remove even the aforesaid minute amount of plastic associated with the silver paint as a binder if this joining technique is used rather than a purely mechanical contact.

Figure 3:
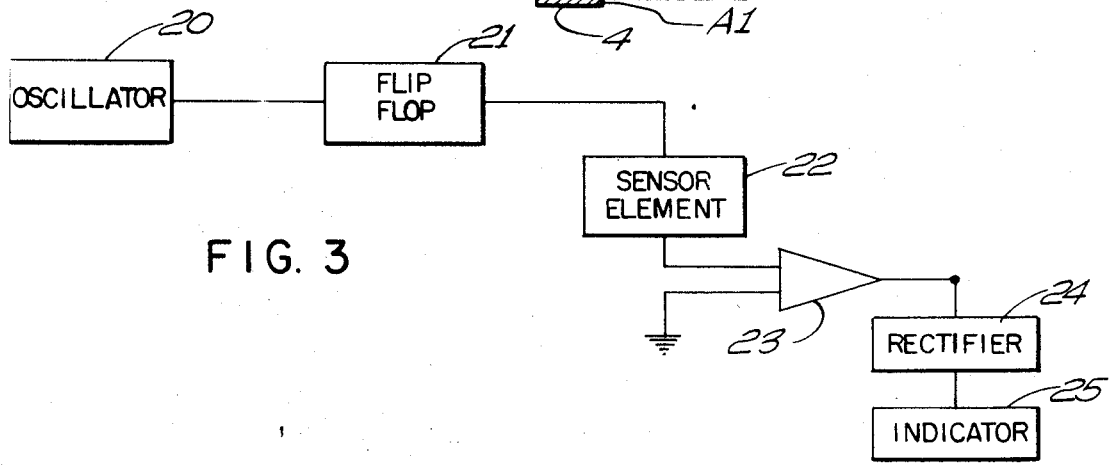
FIG. 3 is an illustration in block diagram form of circuitry suitable for use in conjunction with the humidity sensor of this invention.

In FIG. 3 there is illustrated a typical block diagram of an electrical circuit configuration suitable for providing a measurement system to operate with this humidity sensor. An oscillator 20 provides an output in a sawtooth wave form to a flip-flop unit 21 which in turn provides a square wave output through the sensor element 22 to one of the input terminals of an operational amplifier 23. The output from the operational amplifier is rectified in a rectifier 24 and the output signal is then displayed as a DC level on an indicator 25. The oscillator typically operates at a frequency of 154 cycles per second and the flip-flop unit 21 produces a signal across the sensor element 22 which may vary in magnitude from ¼ to ½ volt. The signal received by the operational amplifier 23 varies then with the capacitance and resistance of the sensor element 22 and hence the output signal applied to rectifier 24 is dependent upon the resistance and capacitance of sensor element 22. The rectifier 24 converts the alternating current signal output from the amplifier 23 into a direct current voltage level which may be then read on an indicator 25. The indicator 25 typically may take the form of a meter or an input to a recording DC volt meter.

Since the resistance and capacitance of element 22 vary in proportion to the absolute humidity, then the direct current voltage indicator may serve as a direct readout of absolute humidity.

What is claimed is:
1. An absolute water vapor sensor comprising:
   a base electrode;
   an oxide coating adhered to one surface of said base electrode, said oxide coating being an aluminum oxide having a thickness no greater than .00001 inch; and
   a second electrode covering at least a portion of said oxide coating, said second electrode being water vapor permeable, the entire remaining exposed surface of said oxide coating being free of contact with any hygroscopic material.

2. A water vapor sensor in accordance with claim 1 and further including a first lead formed from a bus wire, said first lead being mechanically crimped over said base electrode to form an electrical connection thereto, and
   a second lead, said second lead being formed as a spring element having a gold cap at one end thereof, said spring element being positioned such that said gold capped end is urged by spring action into mechanical and electrical contact with said second electrode.

3. A water vapor sensor in accordance with claim 2 wherein said second lead is cemented at one point to said base electrode, said point being removed from said second electrode, said cement being of material such that said second lead is electrically insulated from said base.

4. A water vapor sensor in accordance with claim 1 and including a metallic screen, said metallic screen being positioned to cover the surface of said base electrode opposite to said oxide coated surface and to extend around the edges of said base electrode and partially cover said oxide coated surface, said metallic screen extending beyond the dimensions of said base electrode, and
   a first connecting lead having a gold tipped end, said first connecting lead being positioned so that said gold tipped end makes electrical and mechanical contact with said second electrode;
   means for insulatedly supporting and attaching said first lead to said extended portion of said metallic screen; and
   a second lead, said second lead being mechanically and electrically connected to said metallic screen.

5. A humidity sensor in accordance with claim 2 and further including a shaped mounting element having an electrical feed through mounted therein, said first and second leads being connected to said electrical feed through;
   a frame attached to said mounting element and surrounding said sensor;
   an insulating member mounted within said frame on said first and second leads maintaining said leads in spaced electrically insulated relation, said insulating member having an angular portion extending into contact with said frame whereby lateral motion of said insulating member and said sensor is restricted by said frame when said mounting element is vibrated.

6. The method of producing a humidity sensor element comprising the steps of:
   anodizing an aluminum sheet to produce on one surface a coating of aluminum oxide;
   boiling said anodized aluminum sheet in distilled water;
   removing said anodized sheet from said boiling water and brushing said aluminum oxide to reduce its thickness to no greater than substantially .00001 inch;
   depositing a relatively thin water permeable conductive coating over a portion of said oxide coating; and
   attaching independent electrical leads to said aluminum sheet and to said thin electrically conducting coating.

7. The method of producing a humidity sensor element comprising the steps of:
   anodizing an aluminum sheet to produce on one surface a coating of aluminum oxide;
   boiling said anodized aluminum sheet in distilled water;
   removing said anodized sheet from said boiling water and brushing said aluminum oxide to reduce its thickness to substantially .00001 inch;

depositing a relatively thin water permeable conductive coating over a portion of said oxide coating;

attaching independent electrical leads to said aluminum sheet and to said thin electrically conducting coating; and baking the entire assembly at a temperature between 200° C. and 350° C. for a period of time between 30 and 90 minutes.

References Cited

UNITED STATES PATENTS

| | | | |
|---|---|---|---|
| 1,741,231 | 12/1929 | Grondahl. | |
| 1,957,188 | 5/1934 | Wiggins | 338—207 |
| 2,237,006 | 4/1941 | Koller | 73—336 X |
| 2,754,378 | 7/1956 | Ohlheiser | 73—336.5 X |
| 2,930,016 | 3/1960 | Weston et al. | 73—336.5 X |
| 3,075,385 | 1/1963 | Stover | 73—335 |
| 3,299,387 | 1/1967 | Sanford | 324—65 X |
| 2,084,370 | 6/1937 | Zumwalt | 73—374 X |
| 2,987,658 | 6/1961 | Messenger | 317—236 X |
| 3,121,853 | 2/1964 | Jason et al. | 338—35 |

OTHER REFERENCES

Cutting, C. L., A. C. Jason and J. L. Wood: A Capacitance Resistance Hygrometer, in Journal of Scientific Instruments, vol. 32, pp. 425–431, November 1955.

EDWARD KUBASIEWICZ, Primary Examiner

U.S. Cl. X.R.

73—336.5; 338—35